United States Patent [19]

Moughanni et al.

[11] Patent Number: 5,155,825
[45] Date of Patent: Oct. 13, 1992

[54] PAGE ADDRESS TRANSLATION CACHE REPLACEMENT ALGORITHM WITH IMPROVED TESTABILITY

[75] Inventors: Claude Moughanni; Elie I. Haddad; Rama K. Lakamsani, all of Austin, Tex.

[73] Assignee: Motorola, Inc., Schaumburg, Ill.

[21] Appl. No.: 457,464

[22] Filed: Dec. 27, 1989

[51] Int. Cl.$^5$ .......................................... G06F 12/12
[52] U.S. Cl. .......................... 395/425; 364/243.41; 364/246; 364/246.12; 364/251.1; 364/253; 364/DIG. 1; 364/DIG. 2
[58] Field of Search ... 364/200 MS File, 900 MS File; 395/425

[56] References Cited

U.S. PATENT DOCUMENTS

| | | |
|---|---|---|
| 3,806,883 | 4/1974 | Weisbecker ......................... 364/200 |
| 4,095,283 | 6/1978 | Campbell et al. .............. 364/200 X |
| 4,195,343 | 3/1980 | Joyce ................................. 364/200 |
| 4,562,536 | 12/1985 | Keeley et al. ...................... 364/200 |
| 4,783,735 | 11/1988 | Miu et al. .......................... 364/200 |
| 4,802,086 | 1/1989 | Gay et al. .......................... 364/200 |
| 4,928,239 | 5/1990 | Baum et al. ....................... 364/200 |

Primary Examiner—Joseph L. Dixon
Assistant Examiner—Michael A. Whitfield
Attorney, Agent, or Firm—Charlotte B. Whitaker

[57] ABSTRACT

A replacement method is provided for improving the hit rate and testability of a page address translation cache (PATC). The replacement scheme uses a modified FIFO replacement algorithm. A circular shift register has a pointer which points to each of a predetermined number of translation descriptors stored in the PATC. The shift register pointer has an input for receiving the logic state of a valid bit associated with each of the translation descriptors stored in the PATC. The shift register is advanced after every translation cycle, until the logic state of the valid bit indicates that the denoted translation descriptor is invalid, or until a read/write control signal indicates a PATC write is in progress. Upon detecting an invalid translation descriptor, the circular shift register is disabled, and remains disabled until an address translation "miss" occurs, and a replacement entry is loaded into the PATC. If, however, an address translation miss occurs while the circular shift register is enabled (i.e. before an invalid descriptor is located, or when all descriptors are valid), then the translation descriptor the shift register points to is replaced by a new valid translation descriptor.

12 Claims, 5 Drawing Sheets

PAGE ADDRESS TRANSLATION CACHE REPLACEMENT ALGORITHM WITH IMPROVED TESTABILITY

FIELD OF THE INVENTION

This invention relates generally to memory management units, and more specifically, to a method for replacing a translation entry in a page address translation cache (PATC).

BACKGROUND OF THE INVENTION

In today's high performance data processing systems, virtual memory capabilities increase overall system performance. Generally, these virtual memory data processing systems rely upon sophisticated memory management systems to perform high-speed virtual to physical address translations. As a further performance enhancement, many contemporary data processing systems incorporate one or more address translations caches (ATC), which significantly reduce the amount of time required to perform the address translation. Typically, the ATC stores a predetermined number of address translation descriptors, which are used by the memory management unit (MMU) to map the virtual address space onto a physical address space. The operating system initializes all appropriate logical-to-physical address translation information in the ATC of the MMU. The MMU receives the logical addresses, issued by a central processing unit (CPU), and uses the translation descriptors stored in the ATC to perform the logical to physical address translation.

In order to maximize system performance, the ATC must provide high speed and efficient address translation. Generally, the data processing address translation scheme maps fixed-size blocks of addresses called pages, as opposed to independent logical (virtual) addresses, and thus the unit which performs the translation is commonly referred to as a page address translation cache (PATC). The real or physical address space is divided into a predetermined number of page frames, such that the address translation associates a page frame in the physical address space with a page of logical addresses. Each time the CPU issues a logical address to the MMU for address translation, the logical address is compared with the translation descriptors stored in the PATC to determine whether any PATC entry matches the CPU's logical address. When a hit occurs, the PATC performs the translation, and in so doing, provides the corresponding physical address to an external memory device. When a PATC "miss" occurs, the CPU searches a set of translation tables stored in the memory for the correct translation. Although the number of bus cycles associated with the table look-up, or tablewalk exercise varies, in every case the translation table search results in some performance degradation. Thus, in many applications maximum system performance is determined by the hit ratio in the PATC.

The updating and maintenance of the valid entries in the PATC insures maximum system performance. Typically, the PATC is updated when a "miss" occurs, at which time the required translation descriptor is retrieved from memory and loaded into the PATC. The MMU completes the memory access, translating the address through the PATC. The PATC has a fixed storage capacity, therefore, once the PATC is full, a resident translation descriptor must be discarded in order to load the new translation descriptor. The replacement of valid and recently used translation descriptors with the required (new) descriptor may substantially reduce the hit ratio in the PATC, therefore, the determination of the optimal entry for replacement is critical to system performance.

In the prior art, the four most common replacement algorithms are the least recently used (LRU), not last used (NLU), first in first out (FIFO), and random. In order to maintain the LRU policy, a set of LRU registers maintain the current LRU line which is updated based upon the number of cache accesses. Similarly, maintenance of the NLU policy, requires a set of NLU registers to maintain the current NLU line which is updated based upon the number of cache accesses. Consequently, the implementation of the LRU and NLU replacement generally requires additional logic circuitry, therefore, in some applications, the use of the LRU and NLU replacement methods is not feasible. Random replacement algorithms, while easy to implement, often fail to provide the optimum system performance. The actual performance degradation associated with random replacement is a function of the application. In general, random replacement algorithms fail to deliver the performance of the LRU and NLU algorithms. The FIFO replacement algorithm is easy to implement, and requires minimal silicon area. Typically, a shift register pointer indicates a particular entry (entry number zero at reset) at all times until a PATC miss occurs. Once the miss occurs, the PATC entry denoted is replaced by the new entry, and the register is shifted to point to the next entry, and so on in a circular fashion. Thus, the shift register is not shifted again until another PATC miss occurs. Accordingly, valid and frequently used descriptors may be overwritten using the FIFO replacement method.

SUMMARY OF THE INVENTION

Accordingly, it is an object of the present invention to provide a FIFO replacement algorithm for enhancing the hit ratio of a PATC.

It is another object of the present invention to provide a controlled FIFO replacement algorithm with a code dependent random replacement capability.

Yet another object of the present invention is to provide a PATC with built in testability feature.

These and other objects are accomplished in a memory management unit which translates each of a plurality of logical addresses into a corresponding physical address using a respective one of a plurality of resident logical-to-physical translation descriptors, during a translation cycle, and which retrieves a replacement descriptor from an external memory, during a replacement cycle, the memory management unit having a replacement method for determining which of the plurality of resident logical-to-physical translation descriptors to replace. A single data bit is shifted through a circular shift register, in response to a shift clock signal, thereby advancing a shift register pointer from a first one of the plurality of translation descriptors to a next one of the plurality of translation descriptors, after each translation cycle. A valid bit contained in the next one of the plurality of translation descriptors is read, and the shift register pointer is shifted to a subsequent translation descriptor if the valid bit of the next one of the plurality of translation descriptors is a first logic state. The circular shift register is disabled if any of the following conditions occur. The shift register pointer points to an invalid translation descriptor, wherein the valid bit is a second logic value. The shift register pointer points to a valid translation descriptor and an address translation miss occurs in the memory management unit. If the address translation miss occurs when the circular shift register is disabled, the replacement descriptor replaces the invalid translation descriptor, whereas if the address translation miss occurs while the circular shift register is enabled, then the replacement descriptor replaces the valid translation descriptor indicated by the shift register pointer.

DETAILED DESCRIPTION OF THE INVENTION

The terms "assert", "assertion", "negate" and "negation" will be used to avoid confusion when dealing with a mixture of "active high" and "active low" signals. "Assert" and "assertion" are used to indicate that a signal is rendered active, or logically true. "Negate" and "negation" are used to indicate that a signal is rendered inactive, or logically false.

Figure 1:
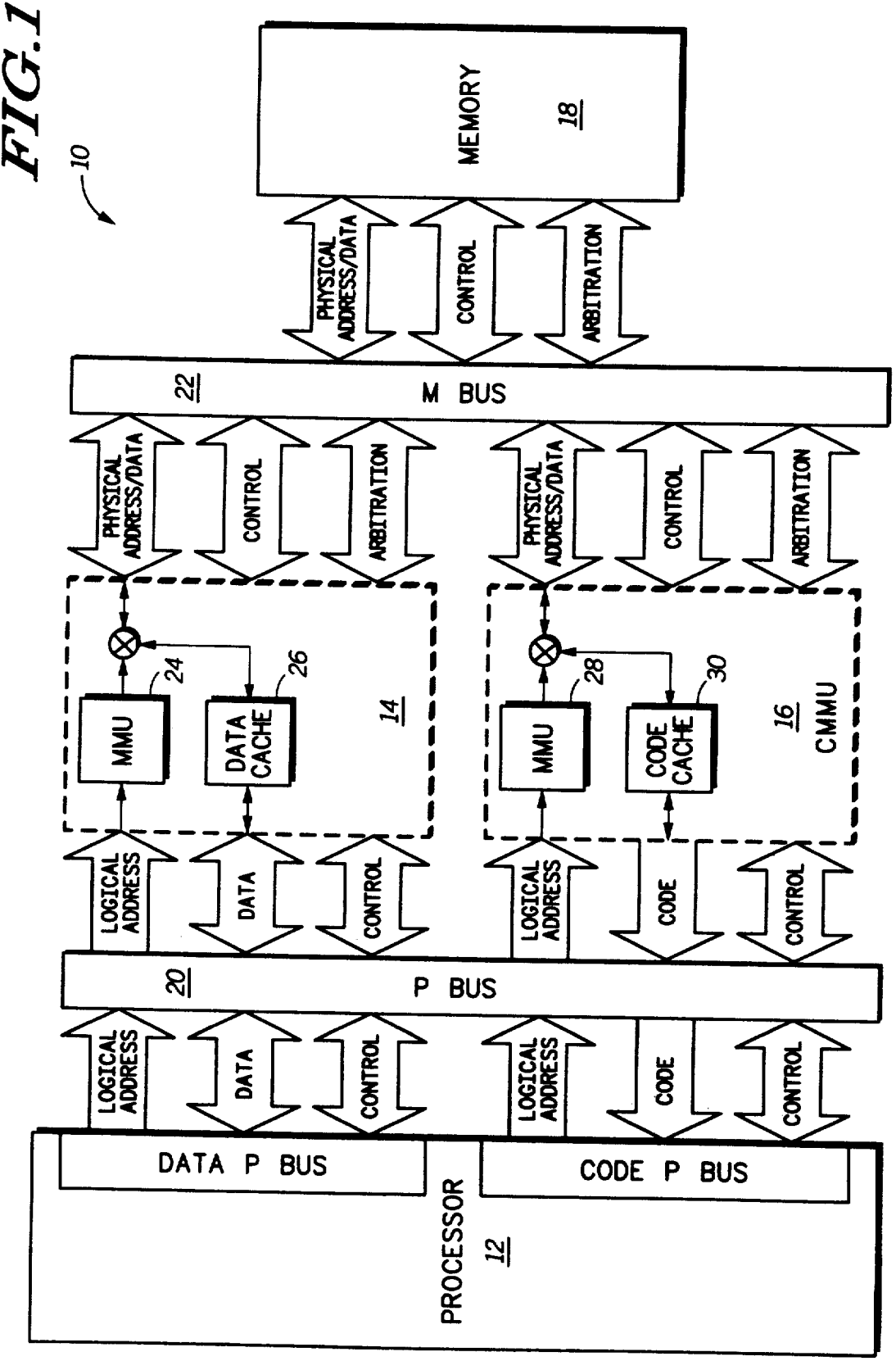
FIG. 1 illustrates, in block diagram form, a data processing system constructed in accordance with the present invention.

Shown in FIG. 1 is a block diagram illustrating a data processing system 10 in accordance with the present invention. In the preferred form, data processing system 10 comprises a processor 12, a first cache memory management unit (CMMU1) 14, and a second cache memory management unit (CMMU2) 16, a memory 18, a processor bus (PBUS) 20, and a multiplexed memory bus (MBUS) 22. CMMU1 14 comprises a memory management unit (MMU) 24, and a data cache 26. Likewise, CMMU2 16 comprises a memory management unit (MMU) 28 which is identical in structure to MMU 24, and a code cache 30, identical in structure to data cache 26. In operation, data processor 10 generates a logical address and transfers the logical address to CMMU1 14 via the PBUS 20. MMU 24 performs the logical to physical address translation and privilege checking for the logical address and, if the mapping is valid, drives the corresponding physical address to data cache 26. If the mapping is not valid, then MMU 24 performs a translation table search, which involves traversing a two-level table of descriptors in memory 16 to locate a new translation descriptor. The new translation descriptor is retrieved from memory 16, and loaded into a PATC 28 (shown in FIG. 2), which performs the requested logical to physical address translation.

In the preferred form, data cache 26 is configured as a 256 sets of four line each. A predetermined number of the lower logical address bits are used to select a set in data cache 26. Upon completion of the address translation, the selection of the cache line occurs, provided however, that a "hit" occurs in data cache 26. Thus, if the data requested by the processor is in the data cache 26 (cache hit), the CMMU 14 returns the data to the processor 12. If the data does not reside in the data cache 26 (cache miss), an MBUS 22 access is performed to retrieve the data from memory 16 (cache line fill).

Figure 2:
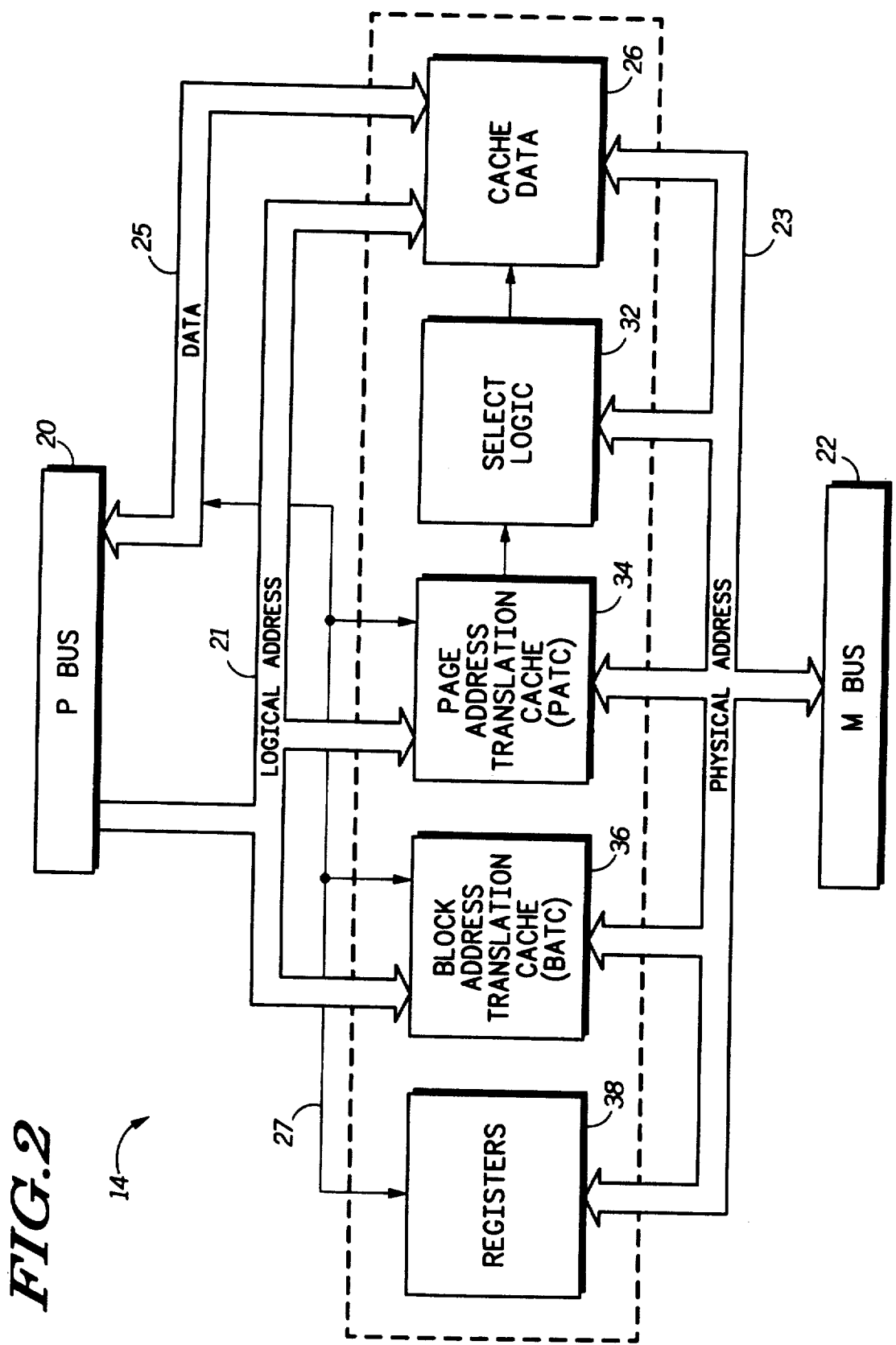
FIG. 2 illustrates, in block diagram form, a cache memory management unit (CMMU) constructed in accordance with the present invention.

Shown in FIG. 2 is a block diagram of a preferred embodiment of CMMU 14. CMMU 14 comprises a data cache 26, select logic 32, page address translation cache (PATC) 34, a block address translation cache 36, and registers 38. Both the PATC 34 and the BATC 36 are fully associative memories, with entries that contain a logical address, the corresponding physical address, and status and protection attributes. Attributes for the translation include write protection, supervisor protection, data cache inhibit, and other status information. In the preferred form of the present invention, PATC 36 contains entries that translate 4K-byte pages of memory. BATC 36 contains entries that translate 512K-byte blocks of memory. A valid bit in each entry of the PATC 34, and BATC 36 identifies the entry as being a valid translation. Translation enable (TE) control bits stored in a set of area descriptors, contained in registers 38, define address translation as being enabled or disabled.

In operation, CMMU 14 performs four functions concurrently. Thus, when a translation is initiated by processor 12, CMMU 14 performs an identify translation (physical address=logical address) if the translation (TE) enable bit is clear in the area descriptors contained in registers 38. Concurrently, the PBUS 20 drives the logical address bus 21, thereby presenting the logical address to the PATC 34, and BATC 36 where it is simultaneously compared to all valid entries. If the logical address matches a PATC 34 entry or a BATC 36 entry (a "hit"), the CMMU 14 concatenates the physical base address (PBA) in the entry with low-order bits from the logical address to form the complete physical address. If there is a hit on both ATCs, the BATC 36 translation takes precedence. The PBUS 20 also concurrently presents the logical address to the data cache 26, and data cache 26 uses the lower order bits of the logical address to perform the data cache set selection. If a match ("hit") occurs, the data cache 26 transfers the requested data to the PBUS 20, via data bus 25. If there is no matching entry resident in data cache 26 ("miss"), the memory 16 (FIG. 1) is accessed to load a cache line in data cache 26. Accordingly, the PATC 34 drives the physical address onto the MBUS 22, via the physical address bus 23, then the requested data is retrieved from memory and loaded into the data cache 26.

Figure 3:
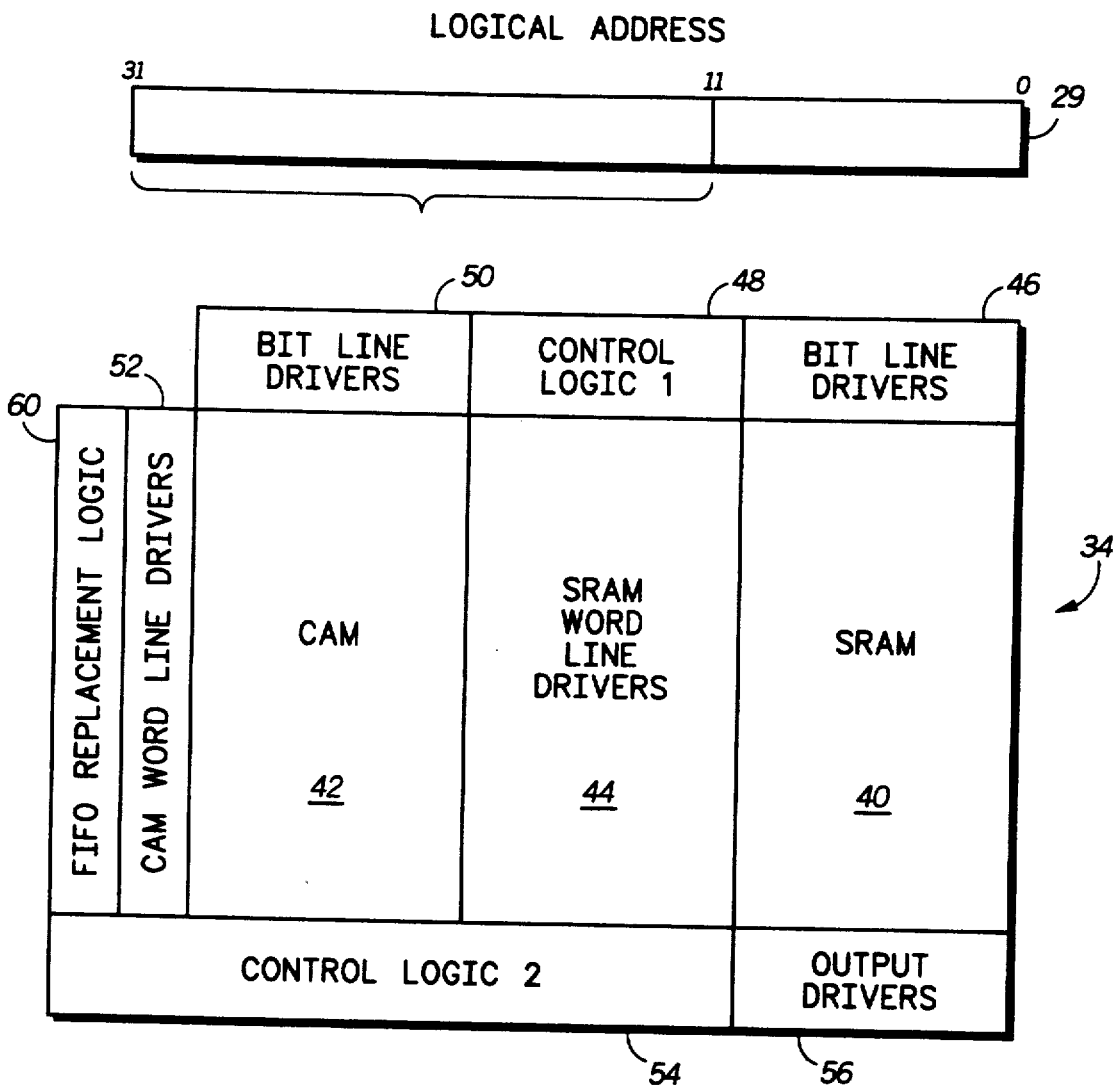
FIG. 3 illustrates, in block diagram form, a page address translation cache (PATC) in accordance with the present invention.

Shown in FIG. 3 is a block diagram of PATC 34, according to a preferred embodiment of the present invention. PATC 34 comprises a static random access memory (SRAM) 40, a content address memory (CAM) 42, SRAM word line drivers (SRAM drivers) 44, SRAM bit line drivers 46, first control logic block (CNTL1) 48, CAM bit line drivers 50, CAM word line drivers 52, a second control logic block (CNTR2) 54, output drivers 56, and FIFO replacement logic 60. Each PATC entry contains a logical page address (LPA), a page frame address (PFA) and status information, which includes a bit denoting the validity (V) of the entry PATC. A predetermined number of the upper bits of logical address 29 (e.g. LA{31-12}) are presented to CAM 42 for comparison to the LPA stored in CAM 42. If the upper address bits of the logical address 29 matches an LPA stored in CAM 42, the CMMU 14 creates a physical address by concatenating a predetermined number of the lower logical address bit (e.g. LA {11-2} to the PFA contained in the matching entry in PATC 34. If a predetermined number of upper bits of logical address 29 fail to match an LPA stored in CAM 42, CMMU 14 creates a new PATC 34 entry by performing a translation table search. CMMU 14 traverses a two-level table of translation descriptors stored in memory 16 to find a new page frame address (PFA). The new PFA is loaded in CAM 42 along with its corresponding logical page address (LPA) and control bits.

Figure 4:
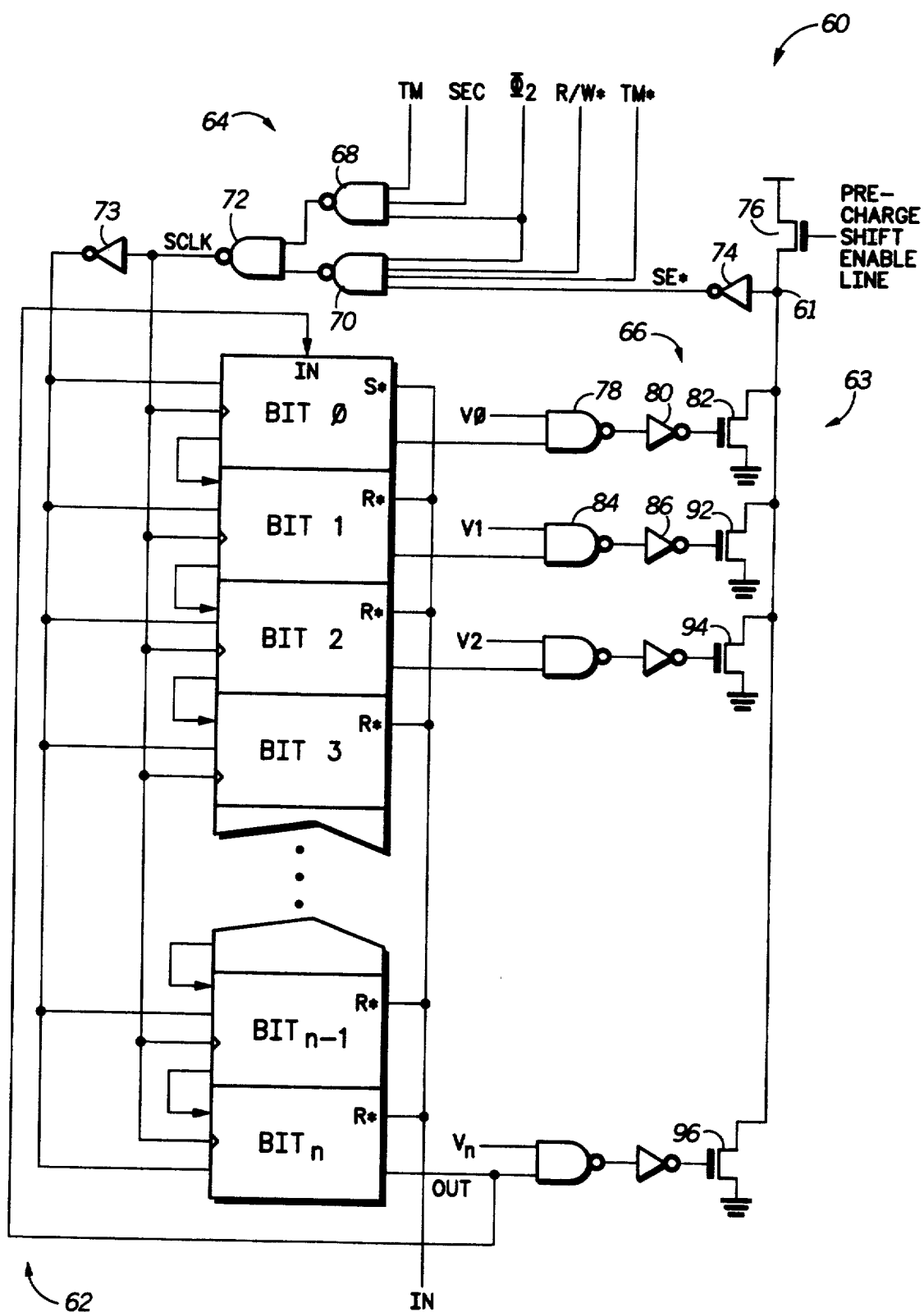
FIG. 4 illustrates, in partial schematic form, a preferred embodiment of the FIFO replacement logic circuitry of the PATC, in accordance with the present invention.
Figure 5A:
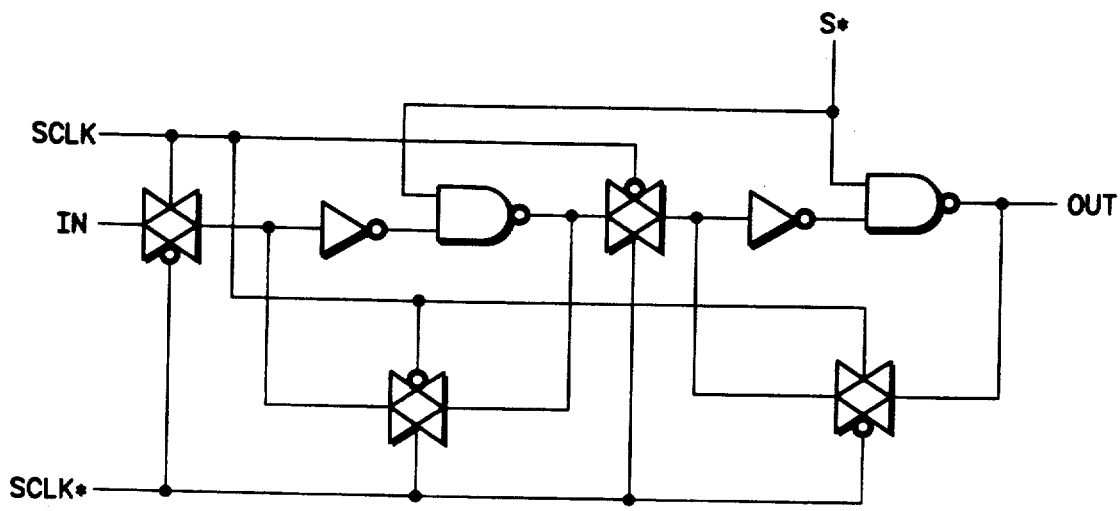
FIG. 5A-5B illustrates, in schematic form, a preferred embodiment of a circular shift register, in accordance with the present invention.
Figure 5B:
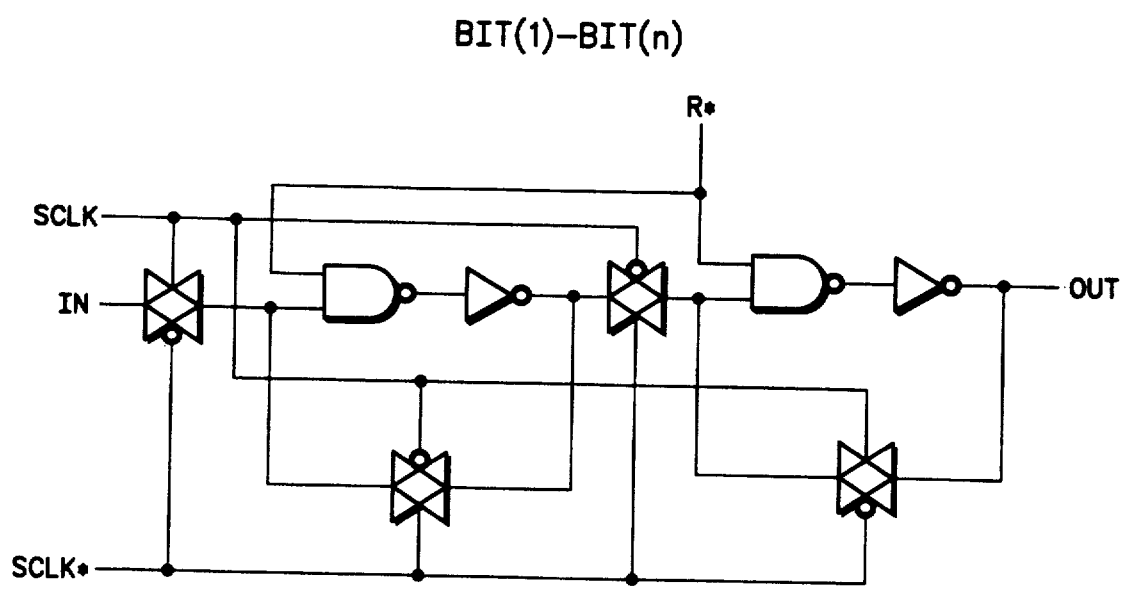

In a preferred embodiment of the present invention, PATC 34 contains 56 entries that provide address translation and control and protection information for the logical-to-physical page translation. When PATC 34 is full, and an address translation "miss" occurs, a resident entry must be discarded (overwritten) in order to load the replacement entry. In accordance with the present invention, PATC 34 uses a modified first-in-first-out (FIFO) replacement scheme to select the resident PATC 34 entry that will be overwritten. FIG. 4 illustrates a block diagram, in partial schematic form, of the FIFO replacement circuitry 60 of PATC 34. The FIFO replacement circuitry 60 comprises a circular shift register 62 (shown in FIG. 5A-B), shifting logic 64, and selection logic 66. Shifting logic 64 comprises a first NAND gate 68, a NAND gate 70, a NAND gate 72, inverters 73 and 74, and an N-channel transistor 76.

The present invention incorporates a testability feature to simplify the task of testing the PATC 34. In test mode, a TM signal is asserted (logic high), and, an external tester (not shown) holds the SEC signal high for a translation cycle, in order to shift the circular shift register 62. During normal system operation, the TM signal is a negated, and the SEC signal is negated, and shifting logic 64 provides the mechanism for shifting the circular shift register 62. NAND gate 68 has inputs for receiving the test mode (TM) signal, the shift enable (SEC) control signal, and a $\phi_2$ clock signal, and an output. NAND gate 70 has inputs for receiving a read-/write signal (R/W*), a complementary test mode signal (TM*), a complementary shift enable (SE) signal, the $\phi_2$ clock signal, and an output. NAND gate 72 has an input for receiving the outputs of NAND gates 68 and 72, and an output for providing a shift clock (SCLK), and complement thereof to circular shift register 62. Inverter 73 has an input coupled to the output of NAND gate 68, for receiving the SCLK signal, and an output for providing the complementary shift clock signal (SCLK*). Transistor 76 has a gate for receiving a shift enable signal, a source connected to a positive power supply, and a drain connected to a node 61, for providing a shift enable signal. Inverter 74 has an input connected to node 61, and an output for providing a complementary shift enable signal (SE*).

Selection logic 66 comprises a NAND gate 78, an inverter 80, and an N-channel transistor 82. Selection logic 66 is coupled to each bit of the circular shift register 62. In the present invention, circular circular shift register 62 is an n-bit register, where n equals the number of translation entries stored by the PATC 34 (e.g. 56). In operation, each bit of circular shift register 62 is initialized to a logic "0" state, except for bit 0, which is set to a logic "1" state. Upon initialization, selection logic 66 points to the first entry in the PATC 34. CMMU 14 asserts the R/W* signal, thereby indicating a request to READ data stored in the data cache 26, and the precharge shift enable line goes to a high logic state. As a result, transistor 76 becomes conductive, and charges node 61 to a logic high voltage level, causing inverter 74 to provide a logic low shift enable (SE*) signal to NAND gate 70. Accordingly, NAND gate 70 receives the READ signal (R/W*=1), the complementary shift enable signal (SE*=0), $\phi_2$ clock signal, and TM* (logic high), and therefore, the output of NAND gate 70 is a logic high, irrespective of the logic state of the $\phi_2$ clock. NAND gate 68 receives the negated SEC signal, the negated TM signal, the $\phi_2$ clock signal, and provides a logic high output to NAND gate 72.

NAND gate 72 receives the outputs of NAND gate 68 and NAND gate 70, and provides the SCLK output signal to inverter 73 and circular shift register 62. Since the output of NAND gate 68 remains a logic high during normal operation, the output of NAND gate 70 controls the clocking of circular shift register 62. For example, when SE* is a logic high, the shift register is enabled, because the SCLK provided by NAND gate 72 follows the logic state of the $\phi_2$ clock signal, and thus, clocking logic 64 provides a SCLK signal to circular shift register 62. Conversely, when SE* is a logic low, the output of NAND gate 70 is a logic "1" irrespective of the logic state of the $\phi_2$ clock signal. Consequently, the output of NAND gate 72 no longer follows the logic state of the $\phi_2$ clock signal.

The logic state of the SE* signal is determined by the voltage at the charge node 61. Selection logic 66 operates to control the voltage at the charge node 61. Connected to node 61 are n transistors which function as pulldown transistors 63. For clarity, only four transistors, 82, 92, 94 and 96 of the n total are shown in FIG. 4, as comprising pull-down transistors 63. Pull down transistors 63 provide a current path from the charge node 61 to ground, when selection logic 66 points to an entry that has is valid (e.g. $V_n=1$). In the present invention, NAND gate 78 is coupled to the CAM 42 for receiving a page valid bit signal ($V_n$) of each entry stored in the CAM 42. Circular shift register 62 is shifted every cycle, due to the shifting logic 64, until one of the following conditions occurs: (1) the selection logic 66 points to an invalid PATC entry ($V_n=0$); or (2) the R/W* signal is negated, indicating a PATC write (load) is in process.

During normal address translation, the test mode signal TM is a logic low, thus TM* is a logic high. During initialization, reset logic in CONTR2 54 (FIG. 4) negates an input (IN) signal, thereby setting bit 0, of circular shift register 62, to a logic "1" state, and resetting bits 1-n to a logic "0" state. Since bit 0 is now set, NAND gate 78 receives a logic "1", and the logic state of the page valid bit ($V_0$), therefore, selection logic 66 points to the first page entry in PATC 34. In the case where the first page entry is valid ($V_0=1$), NAND gate 78 provides a logic low signal to inverter 80, which in turn provides a logic high signal at the gate of transistor 82. In response to the logic high on its gate, transistor 82 becomes conductive, and discharges the voltage at node 61. Consequently, the voltage at node 61 drops to a logic low level, thereby causing inverter 74 to provide a logic high signal to NAND gate 70. Since NAND gate 70 receives a logic high at its shift enable input (SE*=1), NAND gate 72 provides a SCLK signal, which follows the $\phi_2$ clock signal, and therefore, circular shift register 62 remains enabled. Accordingly, circular shift register 62 shifts the logic "1" into bit 1 position. As a result, selection logic 66 now points to the second entry stored in PATC 34.

Since bit 1 is now a logic high state, NAND gate 84 receives a logic high (bit 1), and the logic state of the page valid bit ($V_1$), of the second page entry of PATC 34. If the second page entry is valid, circular shift register 62 will continue shifting as described above. If however, the second page entry is invalid, $V_1=0$, NAND gate 84 provides a logic high output signal to inverter 86. Inverter 86 provides a logic low voltage at the gate of transistor 92, thereby causing transistor 92 to be nonconducting. Consequently, the voltage at node 61 remains at its precharged logic high state, causing inverter 74 to provide a logic low SE* signal to NAND gate 70. Since NAND gate 70 receives a logic low at its shift enable input (SE*=0), the SCLK signal, generated by NAND gate 72, remains at a logic low state, therefore, circular shift register 62 is disabled. Accordingly, circular shift register 62 does not shift the logic "1" into bit 2, and therefore, the selection logic 66 continues to point at the invalid PATC 34 entry.

Circular shift register 62 remains disabled until an address translation "miss" occurs. Once an address translation "miss" occurs, a new valid replacement entry is retrieved from the translation tables stored in main memory 16, and loaded into the PATC 34. The replacement entry is loaded into the PATC 34 at the location indicated by the selection logic 66. Consequently, the invalid PATC 34 entry is overwritten by the replacement entry. If however, an address translation "miss" occurs while the circular shift register 62 is enabled (SE*=1, before an invalid entry is located, or when all entries in PATC 34 are valid), CMMU 14 disables the circular shift register 62 prior to retrieving the replacement entry. In this case, CNTR1 48 negates the Read signal (R/W*=0), thereby causing the NAND gate 70 to provide a logic high, irrespective of the logic state of the $\phi_2$ clock. Consequently, NAND gate 72 provides a logic low SCLK signal, thereby disabling circular shift register 62. CMMU 14 retrieves a valid replacement entry from main memory 16, and replaces the PATC 34 entry, which the selection logic 66 points to, with the new valid entry. Thus, the PATC 34 implements a random replacement scheme, by discarding the entry indicated by selection logic 66. Essentially, the random aspect of the replacement scheme is dependant upon the number of address translation "hits" which occur between replacements. Once the replacement entry is loaded into PATC 34, the R/W* signal is asserted, thereby enabling circular shift register 62.

During test mode, the TM signal is asserted by an external tester (not shown). The tester holds the shift enable controls (SEC) signal high for one translation cycle. NAND gate 68 receives the logic high TM signal, the logic high SEC signal, and the $\phi_2$ clock. The output signal of NAND gate 68 is, therefore, determined by the logic state of the $\phi_2$ clock. NAND gate 70 receives a logic low test mode signal (TM*=0), therefore, the output of NAND gate 70 is a logic high, irrespective of the logic state of the $\phi_2$ clock. Thus, since the output of NAND gate 70 remains a logic high during test mode operation, the output of NAND gate 68 controls the clocking of circular shift register 62. This feature facilitates testing of the PATC 34.

While the present invention has been described in a preferred embodiment, it will be apparent to those skilled in the art that the disclosed invention may be modified in numerous ways and may assume many embodiments other than that specifically set out and described above. Whereas, the PATC 34 in the preferred embodiment is a fully associative memory, the present invention may be used with a set associative cache also. In an alternate embodiment, each set of the set associative cache has a corresponding FIFO replacement mechanism (circular shift register 62), in accordance with the present invention. Accordingly, it is intended by the appended claims to cover all modifications of the invention which fall within the true spirit and scope of the invention.

We claim:

1. In a memory management unit which translates each of a plurality of logical addresses into a corresponding physical address using a respective one of a plurality of resident logical-to-physical translation descriptors, during a translation cycle, and which retrieves a replacement descriptor from an external memory, during a replacement cycle, a replacement method for determining which of said plurality of resident logical-to-physical translation descriptors to replace comprising the steps of:

shifting a single data bit through a circular shift register, in response to a shift clock signal, when a valid bit contained in a first one of said translation descriptors is a first logic value, thereby advancing a shift register pointer from said first one of said plurality of translation descriptors to a next one of said plurality of translation descriptors, after each translation cycle;

reading said valid bit contained in said next one of said plurality of translation descriptors, and shifting said shift register pointer to a subsequent one of said plurality of translation descriptors, if said valid bit of said next one of said plurality of translation descriptors is said first logic value;

disabling advancement of said circular shift register pointer if any of the following conditions occur:
 said circular shift register pointer points to an invalid translation descriptor, wherein said valid bit is a second logic value; or
 said circular shift register pointer points to a valid translation descriptor and an address translation miss occurs in said memory management unit;

whereby if said address translation miss occurs when said circular shift register pointer is disabled, said replacement descriptor replaces said invalid translation descriptor pointed to by said circular shift register pointer, and if said address translation miss occurs while said circular shift register pointer is enabled then said replacement descriptor replaces said valid translation descriptor pointed to by said shift register pointer.

2. The replacement method according to claim 1, wherein the step of shifting said single bit through said circular shift register occurs after each translation cycle until said circular shift register pointer points to said invalid translation descriptor, or said address translation miss occurs.

3. The replacement method according to claim 2, further comprising the step of enabling said circular shift register after said replacement translation descriptor is retrieved from said memory, and loaded into said memory management unit.

4. In a memory management unit having means for translating each of a plurality of logical addresses into a corresponding physical address using a respective one of a plurality of resident logical-to-physical translation descriptors, during a translation cycle, and for retrieving a replacement descriptor from an external memory, during a replacement cycle, a circuit for determining which one of said plurality of resident logical-to-physical translation descriptors is replaced by said replacement descriptor, said circuit comprising:

- first means for shifting a single data bit through n-stages of a circular shift register, in response to a shift clock signal, when a valid bit contained in a first one of said translation descriptors is a first logic value thereby simultaneously advancing a shift register pointer from said first one of said plurality of translation descriptors to a next one of said plurality of translation descriptors, after each translation cycle;

- second means for reading said valid bit contained in said next one of said plurality of translation descriptors, and for advancing said circular shift register pointer to a subsequent translation descriptor, if said valid bit of said next one of said plurality of translation descriptors is said first logic value; and

- third means for disabling advancement of said shift register if any of the following conditions occur:

said circular shift register pointer points to an invalid translation descriptor, wherein said valid bit is a second logic value; or said circular shift register pointer points to a valid translation descriptor and an address translation miss occurs in said memory management unit;

wherein if said address translation miss occurs when said circular shift register is disabled, said replacement descriptor replaces said invalid translation descriptor pointed to by said circular shift register pointer, and if said address translation miss occurs while said shift register is enabled then said replacement descriptor replaces said valid translation descriptor pointed to by said circular shift register pointer.

5. The circuit according to claim 4, wherein said second means provides said shift clock to said circular shift register after each translation cycle until said circular shift register pointer points to said invalid translation descriptor, or until said address translation miss occurs.

6. The circuit according to claim 5, wherein said first means comprises:

- an n-bit circular shift register, wherein a first bit of said n-bits is set to a logic "1" value, in response to an initialization signal, and said logic "1" is shifted through said circular shift register and provided as an output, said output being coupled to an input to said circular shift register;

- a first NAND gate having a first input for receiving a complementary shift enable (SE*) signal, a second input for receiving a read/write* (R/W) signal, a third input for receiving a clock signal, a fourth input for receiving a complementary test mode (TM*) signal, and an output;

- a second NAND gate having a first input for receiving a shift enable control (SEC) signal, a second input for receiving said clock signal, and an output;

- a third NAND gate having a first input coupled to the output of the first NAND gate, and a second input coupled to the output of the second NAND gate, and an output for providing a shift clock (SCLK) signal to said circular shift register; and

- a first inverter having an input coupled to the output of said third NAND gate, and an output for providing a complementary shift clock (SCLK*) signal to said circular shift register.

7. The circuit according to claim 6, wherein said second means comprises:

- a fourth NAND gate having a first input coupled to said valid bit one of said plurality of translation descriptors, and a second input coupled to a bit of said n-bit circular shift register, and an output;

- a second inverter having an input coupled to the output of the fourth NAND gate, and an output

- a first transistor having a control electrode coupled to the output of the first inverter, and a first current electrode coupled to a first node, and a second current electrode coupled to a negative power supply;

whereby said second means is coupled to each of said n-bits of said circular shift register, and coupled to said valid bit of each one of said plurality of resident logical-to-physical address translation descriptors.

8. The circuit according to claim 7, wherein said third means comprises:

- a second transistor having a control electrode for receiving a precharge shift enable (SE), a first current electrode coupled to a positive power supply, and a second current electrode coupled to said first node; and

- a third inverter having an input coupled to said first node, and an output for providing said complementary shift enable (SE*) signal to said first NAND gate.

9. The circuit according to claim 8, wherein said first means is operable in a test mode, in which an external tester provides said test mode (TM) signal, and said complementary test mode signal (TM*), and said shift enable control (SEC) signal, and thereby controls the shifting of said n-bit circular shift register.

10. In a memory management unit having means for translating each of a plurality of logical addresses into a corresponding physical address using a respective one of a plurality of resident logical-to-physical translation descriptors, during a translation cycle, and for retrieving a replacement descriptor from an external memory, during a replacement cycle, a circuit for determining which one of said plurality of resident logical-to-physical translation descriptors is replaced by said replacement descriptor, said circuit comprising:

- first means for shifting a single data bit through n-stages of a circular shift register, in response to a shift clock signal, when a valid bit contained in a first one of said translation descriptors is a first logic value, thereby simultaneously advancing a shift register pointer from said first one of said plurality of translation descriptors to a next one of said plurality of translation descriptors, said first means comprising an n-bit circular shift register, wherein a first bit of said n-bits is set to a logic "1" value, in response to an initialization signal, and said logic "1" is shifted through said circular shift register after, each translation cycle, and provided as an output, said output being coupled to an input to said circular shift register;

- selection logic means coupled to each bit of said n-bit circular register, said selection logic means pointing to said first translation descriptor, in response to said initialization signal, and said selection logic means reading a valid bit contained in said first translation entry, and advancing said shift register pointer to a subsequent translation descriptor, after said translation cycle, if said valid bit of said first translation descriptor indicates is a first logic value; and enable means coupled to said first means and said selection logic means for enabling advancement of said shift register pointer until said selection logic means detects an invalid translation descriptor or an address translation miss occurs; whereby if said address translation miss occurs when said first means is disabled, said replacement descriptors replaces said invalid translation descriptor pointed to by said circular shift register pointer, and if said address translation miss occurs while said first means is enabled then said replacement descriptor replaces a valid translation descriptor pointed to by said circular shift register pointer.

11. The circuit according to claim 10 wherein said enable means provides a shift clock to said circular shift register after each translation cycle until said circular shift register pointer points to said in valid translation descriptor or until said address translation miss occurs, said enable means comprising:

a first NAND gate having a first input for receiving a complementary shift enable (SE*) signal, a second input for receiving a read/write* (R/W) signal, a third input for receiving a clock signal, a fourth input for receiving a complementary test mode (TM*) signal, and an output;

a second NAND gate having a first input for receiving a shift enable control (SEC) signal, a second input for receiving said clock signal, and an output;

a third NAND gate having a first input coupled to the output of the first NAND gate, and a second input coupled to the output of the second NAND gate, and an output for providing a shift clock (SCLK) signal to said circular shift register; and a first inverter having an input coupled to the output of said third NAND gate, and an output for providing a complementary shift clock (SCLK*) signal to said circular shift register;

a first transistor having a control electrode for receiving a precharge shift enable (SE), a first current electrode coupled to a positive power supply, and a second current electrode coupled to a first node; and a second inverter having an input coupled to said first node, and an output for providing said complementary shift enable (SE*) signal to said first NAND gate.

12. The circuit according to claim 11 wherein said selection means comprises:

a fourth NAND gate having a first input coupled to said valid bit one of said plurality of translation descriptors, and a second input coupled to a bit of said n-bit circular shift register, and an output;

a third inverter having an input coupled to the output of the fourth NAND gate, and an output; and a second transistor having a control electrode coupled to the output of the third inverter, and a first current electrode coupled to a first node, and a second current electrode coupled to a negative power supply;

* * * * *